June 22, 1965      E. L. SCHLAGE      3,190,093
PIN TUMBLER CYLINDER AND KEY SYSTEM Filed Feb. 7, 1963      4 Sheets-Sheet 1

INVENTOR.
ERNEST L. SCHLAGE
BY Lothrop & West
ATTORNEYS

INVENTOR.
ERNEST L. SCHLAGE
BY Lothrop & West
ATTORNEYS

INVENTOR.
ERNEST L. SCHLAGE
BY Lothrop + West
ATTORNEYS

INVENTOR.
ERNEST L. SCHLAGE
BY Lothrop & West
ATTORNEYS

United States Patent Office 3,190,093
Patented June 22, 1965

3,190,093
PIN TUMBLER CYLINDER AND KEY SYSTEM
Ernest L. Schlage, Burlingame, Calif., assignor to
Schlage Lock Company, a corporation
Filed Feb. 7, 1963, Ser. No. 256,852
11 Claims. (Cl. 70—383)

My invention relates to a pin tumbler cylinder unit and key mechanism in which the unit can be put in unlocked condition by any one of a series of different keys, but the use of a key later in the series makes the unit unresponsive thereafter to keys earlier in the series. Stated more particularly, the invention contemplates a cylinder unit which may be repeatedly put in unlocked condition by a primary (temporary) key until such time as the unit has once been put in unlocked condition by a secondary (permanent) key. Thereafter the unit may be repeatedly put in unlocked condition by the secondary key until it is once put in unlocked condition by a tertiary key, and so on.

My invention also relates to a pin tumbler cylinder unit in which a primary key is effective, but a secondary key is ineffective, until a trigger key is used. Thereafter the primary key is ineffective but the secondary key is effective.

There are many instances in which a lock unit can with advantage be temporarily keyed to one key and can then be altered so that the temporary key is no longer of avail, but a subsequent permanent key is freely usable. For example, when a building is being built or has recently been completed, it is often desirable to close all or portions of the building for reasonable security, but also to supply one or more people with keys affording ready access. It is desired, however, that eventually the building will be made accessible only to a different group of people and the original group will at that time be permanently excluded. To avoid the expense and labor of installing and subsequently removing temporary lock units and then finally installing an entirely different set of permanent lock units, there is provided a way pursuant to the invention to install the permanent lock units originally. Temporary keys are issued to the requisite people. To guard against a failure to retrieve all of such keys, there is provided a means for conditioning the lock units automatically to exclude the initial temporary keys and thereafter to afford access only by means of different permanent keys.

Under some circumstances it may be desirable to have more than simply temporary and permanent keys and to have a whole series of keys, each group of keys in one stage of the series being useful during a particular time period and each key in the series being effective to exclude keys earlier in the series. Under other circumstances it may be desirable to make use of an intermediate or trigger key to condition the lock units to render the temporary keys thereafter ineffective and to render the theretofore ineffective permanent keys effective thereafter.

It is therefore an object of the invention to provide a pin tumbler cylinder and key system that can be permanently installed and which can be initially worked by temporary keys, but which after once being worked by permanent keys will no longer respond to the temporary keys.

Another object of the invention is to provide a lock unit in which a key itself will be effective to exclude prior keys in the series.

Another object of the invention is to provide a pin tumbler cylinder and key system in which the alteration of the lock unit, having once been effected by a later key in the series, is irreversible without completely disassembling the lock unit.

Another object of the invention is to provide a pin tumbler cylinder and key system which at different times is responsive to different keys in a series.

A still further object of the invention is to provide a pin tumbler cylinder and key system having especially responsive tumblers.

Another object of the invention is to provide an improved pin tumbler cylinder and key system.

Another object of the invention is to provide a pin tumbler cylinder and key system in which a trigger key is effective to render a lock unit previously responsive to a primary key and not to a secondary key thereafter responsive to the secondary key and not to the primary key.

Other objects of the invention together with the foregoing are attained in the forms of the invention described in the accompanying description and illustrated in the accompanying drawings, in which.

The invention disclosed herein is related to that disclosed in my copending applications Serial No. 82,774 filed January 16, 1961, and Serial No. 84,378 filed January 23, 1961.

Figure 4:
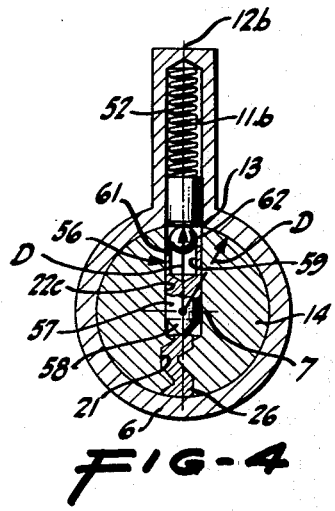
FIGURE 4 is a cross section, the plane of which is indicated by the lines 4—4 of FIGURE 1, showing the interior construction with the parts in position with a primary or temporary key.

While the pin tumbler cylinder and key system of the invention can be embodied in a number of different days, it is typically embodied for use in a customary form of cylindrical lock unit. As part of the lock unit, a body 6, of metal, is designed to be mounted in the remainder of the lock structure (not shown). The body 6 is approximately symmetrical about a central, vertical plane passing through an axis 7 of symmetry. A rotor bore 8 extends entirely through the body 6. A projecting fin 9 is integral with the remainder of the circular cylindrical body. There is at least one tumbler bore 11 in the fin 9. The usual body has a plurality of tumbler bores therein but the number can range from a single one up to, say, five or seven. Each of the tumbler bores 11, 11a, 11b, 11c and 11d is like the others and is disposed on a related one of a number of cross axes 12, 12a, 12b, 12c and 12d perpendicular to the axis 7. Each of the various tumbler bores intersects the rotor bore 8 to provide a shoulder 13 (FIGURE 4) at their intersection.

Mounted within the rotor bore 8 is a rotor 14 preferably of metal having a generally circular cylindrical exterior contour fitting the body 6 snugly but with freedom of rotation of the rotor 14 about the axis 7. At one end the rotor is enlarged into a disk-like flange 16. At the other end the rotor is threaded or otherwise contoured to receive an applied cap 17 from which a shaft 18 projects. The shaft 18 rotates together with the rotor 14 and is the member actuating the lock bolt (not shown). The rotor 14 is machined, usually by broaching, to provide a key channel 21 of any desired cross section. The key channel configuration or cross section is substantially uniform throughout the length of the rotor and in the usual case lies on both sides of the axis 7.

Also formed in the rotor and preferably in locations so that in at least one rotated position of the rotor they serve as continuations of the tumbler bores are one or more pin bores 22. As with the tumbler bores, there are customarily from five to seven of these such as 22a, 22b, 22c and 22d, each being substantially like the others. The pin bores extend far enough into the rotor in a radial direction to make intersections with the key channel at least to the maximum distance for tumbler travel.

Designed to be received in the key channel 21 are keys of two or more series. These all have a common cross sectional contour which will fit readily within the channel 21 and they all have key configurations for proper combinations. Each series may have many keys. Usually, the number of series is limited to the number of pin bores or tumbler bores. For example, if there are five pin bores, then there may be five series of keys. It is considered at present that two keys constitutes the minimum series.

Figure 1:
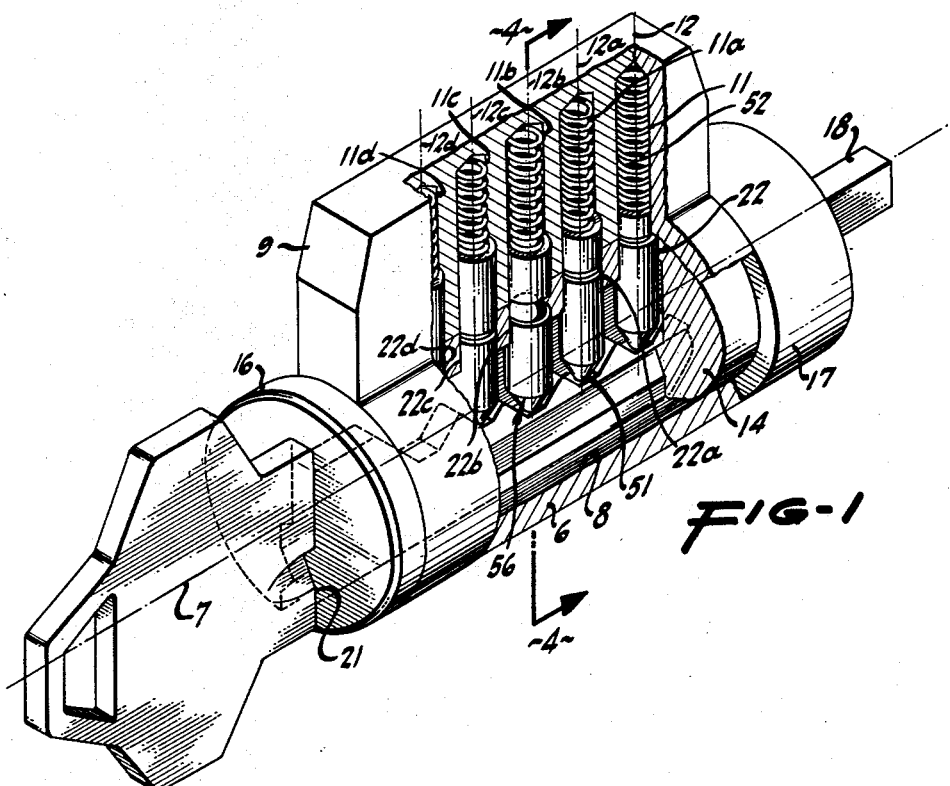
FIGURE 1 is an isometric view of a pin tumbler cylinder and key lock system, portions of the mechanism being broken away to disclose the interior construction, and the remaining parts of the lock unit being omitted.
Figure 2:
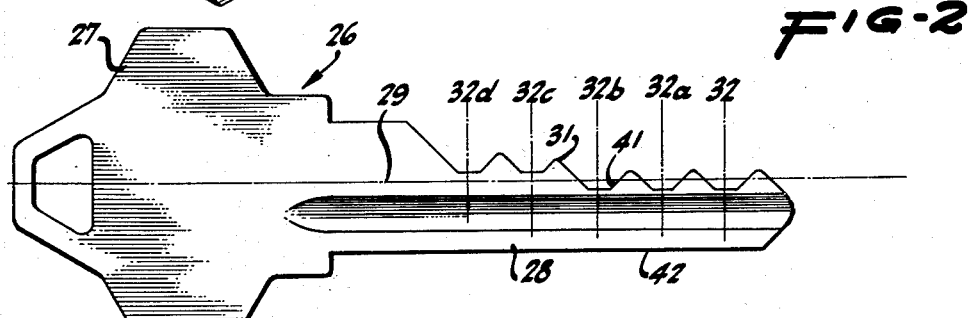
FIGURE 2 is a side elevation of a primary or temporary key for use with the structure of FIGURE 1.

A key belonging to the first series is one first to be used with the remainder of the mechanism in point of time. This key 26, as shown in FIGURE 2, is termed a primary or temporary key and includes a key bow 27 and also a key shank 28. The key extends along an axis 29 and has certain serrations along the upper edge 31. Each serration has especial reference to a respective one of several transverse center lines such as 32, 32a, 32b, 32c and 32d perpendicular to the axis 29.

Figure 3:
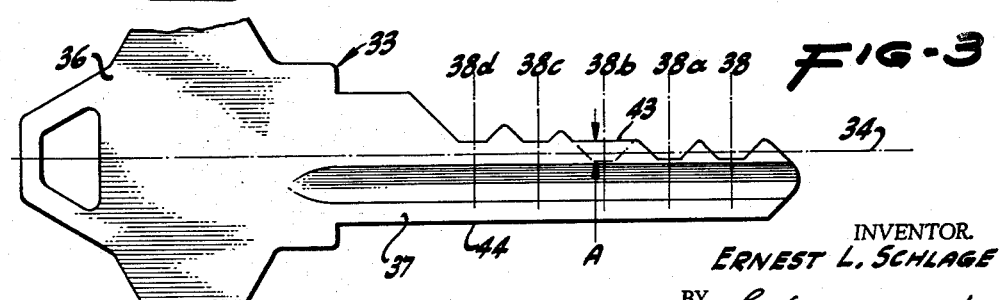
FIGURE 3 is a side elevation of a secondary or permanent key in the series useful with the structure of FIGURE 1.

A key belonging to the next or later series is called a secondary or permanent key and is shown in FIGURE 3. This key 33 extends along an axis 34 and is provided with a key bow 36 comparable to the key bow 27. The shank 37 of the key 33 has a similar cross section to that of the key 26 and to casual observation is virtually identical with the primary key. Serrations on the key 33 are arranged to be symmetrical about perpendicular center lines 38, 38a, 38b, 38c and 38d spaced and disposed in the same fashion as the various axes 32, 32a, 32b, 32c and 32d. The salient distinction between the primary and secondary keys is that on one of the primary key center lines, such as 32b, for example, the serration is constituted by a notch 41 having considerably greater depth or terminating closer to the lower edge 42 of the key than does the serration 43 of the secondary key 33 on the corresponding axis 38b. The difference in depth of the serrations 41 and 43 is a predetermined amount A (FIGURE 3).

To cooperate with a key in the rotor 8 most of the various tumbler bores such as 11, 11a 11b, 11c and 11d and the corresponding pin bores 22, 22a, 22b, 22c and 22d are provided with the usual groups of pin tumblers. Most all of the pin tumblers are of a similar, right circular cylindrical construction slidable in the tumbler and pin bores, those in the lowermost locations terminating in rounded or conical lower ends 51. All of the various tumblers are spring-pressed toward the axis 7 by springs 52 located within the tumbler bores. The tumblers follow and accommodate the serrations of an inserted key to provide shear planes between successive tumbler pins substantially coincident with the parting surfaces between the body 6 and the rotor 8.

Pursuant to the invention, in one of the pin bores, at least, there is provided a special telescopic pin tumbler 56. As particularly shown in FIGURE 4, the telescopic pin tumbler comprises a lower body 57 having a rounded lower end 58, the diameter of the body being such that the body translates freely within the pin bore along the respective axis 12b, for example. The length of the body is substantially less than would normally be the case.

The short body is provided with an internal cylindrical cavity 59 leaving a relatively thin annular sleeve 61. A portion of a ball 62 is arranged in juxtaposition with the sleeve. The diameter of the ball is such that it is very slightly greater than the diameter of the sleeve cavity 59. The ball normally is lightly seated in the end of the sleeve with sufficient frictional interference so that the parts will stay together during handling and initial use. In this lightly seated, extended condition, the ball and body have an over-all length, when the telescopic pin tumbler is seated on an inserted primary or temporary key 26, such that the upper periphery of the ball is substantially at a distance D from the axis 7 equivalent to the radius D of the rotor. Consequently, when the temporary key is inserted and the rotor is to be rotated in the body 6, there are proper shear surfaces between the ball 62 and the superposed pin within the bore 11b and the rotation can readily ensue. When the temporary key 26 is withdrawn, the spring 52 is effective upon the pin and all of the parts are restored to normal non-rotatable condition. The primary, temporary key 26, having a relatively low serration or notch 41, can be repeatedly used in this way. During such use, the interfit of the ball 62 and of the sleeve 61 is unchanged and the over-all length of the ball and body 57 remains the same. The spring 52 is not strong enough to overcome the frictional interengagement of the telescopic parts.

Figure 5:
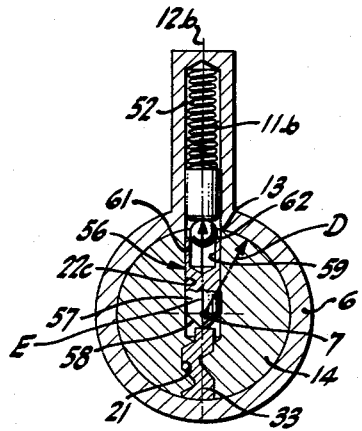
FIGURE 5 is a view similar to FIGURE 4, but showing the parts in position upon the first insertion of a secondary or permanent key.

When the secondary or permanent key 33 in the series is introduced into the key channel as particularly shown in FIGURE 5, then the serration 43, which is relatively high, occupies a position immediately under the telescopic pin tumbler in the location 11b. The parts, not having changed over-all length, then are in the relationship shown in FIGURE 5 with the periphery of the ball 62 at a distance E, greater than D, from the rotational axis. The meeting surfaces of the ball and the superposed tumbler are not in any shear plane of the body and rotor. The dimensions are such that when the rotor is subsequently rotated, the surface of the ball 62 abuts and cams against the shoulder 13, which may be somewhat rounded. The interengagement between the ball and the shoulder is not a blocking contact, but rather is an inclined camming.

Figure 6:
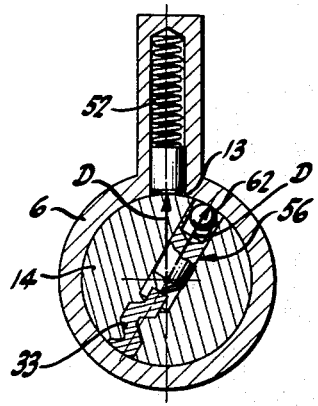
FIGURE 6 is a view of the mechanism of FIGURE 5, but rotated for actuation.

As the rotor continues to turn clockwise, in FIGURE 5, the camming between the ball and the shoulder drives the ball farther into the cavity 59 and slightly expands the annular sleeve 61 so that a tight, frictional, permanent interengagement is provided between the ball and the sleeve wall. The expansion of the sleeve is not enough to impair its sliding motion in the rotor. When the rotor has been turned past the shoulder 13, the ball has been driven far enough into the sleeve so that the over-all dimension of the body 57 and ball 62 (or of the telescopic pin tumbler) is a new shorter value, the top of the ball now being at distance D from the rotational axis rather than the distance E therefrom. This is shown in FIGURE 6. When the rotor subsequently is rotated to its initial position and the key is withdrawn, the parts are restored to their normal non-rotating positions by the spring 52. Subsequent insertions of the secondary key 33 produce a similar actuation of the rotor without difficulty.

Figure 7:
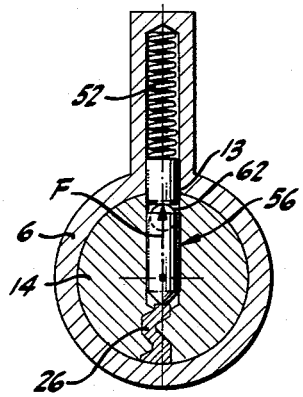
FIGURE 7 is a view similar to FIGURE 6 but showing the parts in their FIGURE 5 position, but with the later insertion of a primary or temporary key.

When, as shown in FIGURE 7, the primary or temporary key 26 is subsequently introduced, the length of the telescopic pin tumbler having been shortened, the key 26 is then sufficient only to lift the top of the ball to a radius or level F less than the radius or level D. This is not sufficient to lift the ball 62 up to the shear plane between the rotor and the body and the rotor cannot be actuated. Thus, the first insertion of the secondary key followed by rotation of the rotor permanently telescopes the telescopic pin tumbler to prevent operation by a key of the earlier series.

Usually this arrangement is sufficiently effective by the use of a telescopic pin tumbler in only one position. However, more than one telescopic pin tumbler can be utilized. They can be disposed in various positions. The keys in the later series, progressively having high serrations instead of the low serrations in the keys of the earlier series, afford successive exclusions.

Figure 8:
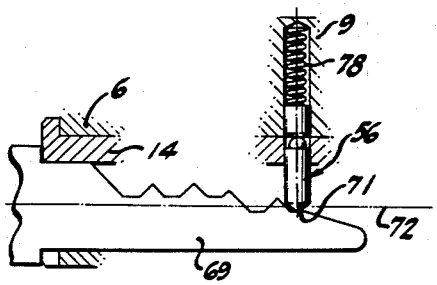
FIGURE 8 is a side elevation of a different form of primary or temporary key.
Figure 9:
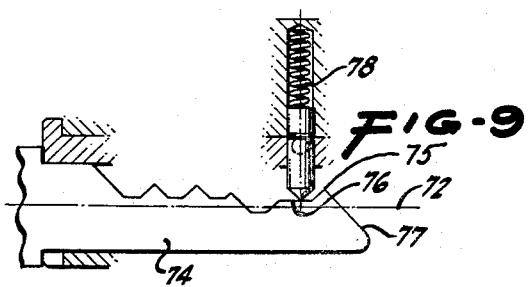
FIGURE 9 is a side elevation of a different form of a secondary or permanent key.

It is not always necessary to provide an arrangement in which the telescopic pin tumbler is telescoped by rotation of the rotor with the key in place. A telescopic tumbler can be put in the innermost bore 11, for example. With this is used a primary key 69 of the sort shown in FIGURE 8. In this the first serration or notch 71 is relatively low or close to the lower edge of the key as the key moves along an axis 72. In the secondary or permanent key 74, shown in FIGURE 9, the serration 76 in the first order is relatively high or far from the lower edge. The contour of the end key surface 77 is a continuous cam extending to an extra hump 75 farther from the lower edge than the serration 76. The primary key is entirely inserted in the key channel and properly positions the extended telescopic pin tumbler for rotor turning. When the secondary key is introduced into the key channel and is axially moved almost completely home, then the cam surface 77 lifts the telescopic pin tumbler over the hump 75. During the lifting movement the spring 78 is compressed to a resistance greater than the resistance of the pin tumbler to telescoping. The over-all tumbler length is thus shortened so that when the serration 76 is in place, a proper shear plane is established and the rotor can be turned. After the mere insertion of the secondary key, when the primary key is again inserted, it is found that the telescopic pin tumbler, having been permanently shortened, does not rise to proper position in the shear plane for rotor rotation. The initial key has been rendered inoperative.

Figure 10:
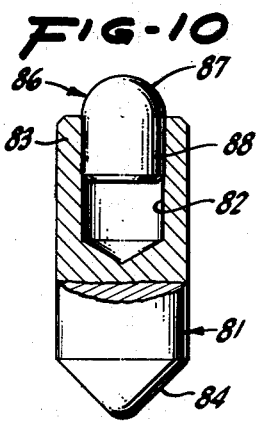
FIGURE 10 is an elevation of a telescopic pin tumbler, portions being broken away.

There are many ways of providing a suitable telescopic pin tumbler. As shown particularly in FIGURE 10, the lower body 81 is as previously described, having an internal cylindrical cavity 82 to leave a sleeve with an annular wall 83. The body has an inclined or cammed lower terminus 84. Instead of a ball, one of the telescoping members is a pin 86 having a hemispherical upper end 87 and having a cylindrical stem 88 having a predetermined amount of intersurface friction with the wall 83. The operation of the parts is as previously described, but there are larger surfaces for frictional interengagement.

Figure 11:
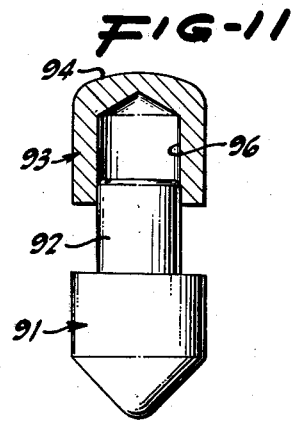
FIGURE 11 is a side elevation of a modified form of telescopic pin tumbler, a portion being illustrated in transverse cross section.

As shown in FIGURE 11, the pin ends can be substantially uniform in diameter. The lower body 91 has a reduced projection 92 over which a cap 93 fits with predetermined frictional interengagement. The cap has a rounded upper end 94 and an internal cylindrical cavity 96 receiving the projection 92.

Figure 12:
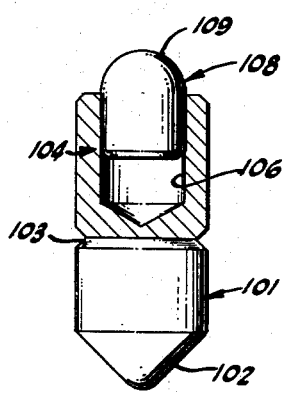
FIGURE 12 is a view of a still further modified form of pin tumbler arrangement, portions being illustrated in cross section.

It is not necessary that the pin which comes into immediate contact with the key be telescoping. As shown in FIGURE 12, a regular form of lower tumbler pin 101 having a conical terminus 102 to interengage with a key can be provided. The pin 101 has a slightly bevelled upper end 103 to accommodate a cup-like pin 104 having an internal cylindrical cavity 106. Extending into the cavity is a telescoping piece 108 with a rounded upper end 109. The intersurface frictional fit and the operation of this construction are substantially as before.

Figure 13:
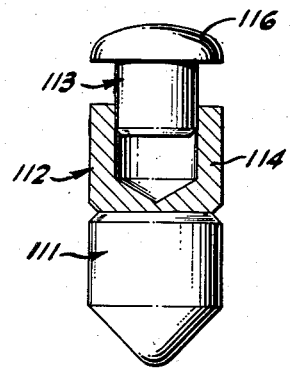
FIGURE 13 is a view of a pin tumbler assembly with portions of this further modified form being shown in cross section.

In the variation shown in FIGURE 13, the substantially standard lower pin 111 has a cup-like adjacent pin 112. A relatively small lower shank 113 which frictionally engages the interior wall of the cup 114 is provided with a mushroom head 116.

Figure 14:
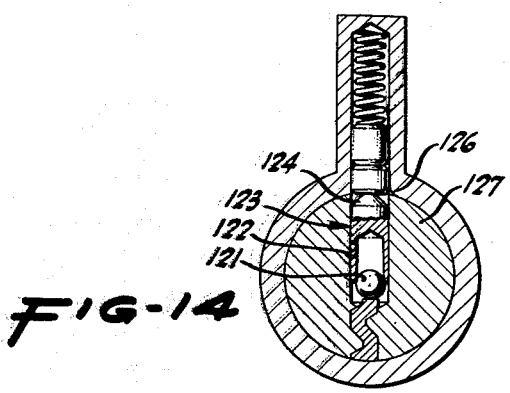
FIGURE 14 is an enlarged view of the cylinder portion of a lock unit in cross section showing a still further modified form of pin tumbler arrangement with a primary or temporary key in position.

As shown in FIGURE 14, it is feasible to invert the telescoping pin tumbler. A ball 121 rests directly upon the inserted primary key and is in light frictional engagement with the interior cavity wall of an inverted cup 122 of a telescopic tumbler pin 123. The pin 123 has a bevelled upper end 124. When a secondary key is inserted and lifts the pin 123 and when the rotor 127 is turned, the upper end 124 cams against a shoulder 126. The ball 121 is thus forced into the cup 122 and reduces the over-all dimension of the pin tumbler.

The telescopic pin tumbler has another use. In the assembly of pin tumbler lock units, a key is put into the rotor and the tumblers are assembled therewith. This is usually done in the factory in an assembly jig or dummy setup. If by chance any of the usual, solid tumblers project above the shear plane of the rotor, they can be hand filed to the precise dimension of the shear plane for free operation. By utilizing telescopic tumblers, it is not necessary to file down any projections. It is merely necessary to turn the key and the rotor in the fixture or dummy. Upon the first rotation the projecting telescopic tumblers are automatically cammed and slightly shortened to the proper dimension.

It is sometimes desired to have a primary key effective exclusively of a secondary key and then to have the secondary key effective exclusively of the primary key. This is accomplished with a telescopic pin tumbler in connection with a special key, usually called a trigger key.

Figure 20:
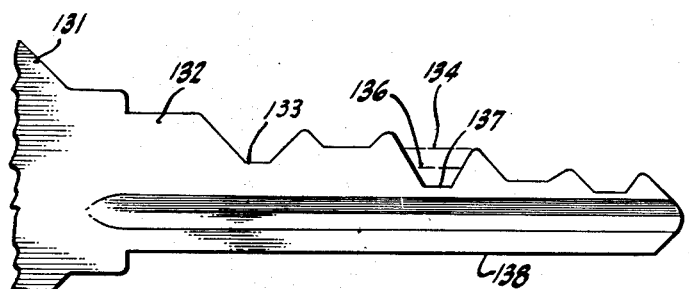
FIGURE 20 is a side elevation of a key showing the contour for temporary, trigger and permanent operation.

The relationship of the keys is such that they are all substantially the same except that in at least one position, the serrations of the keys have a particular relationship. As shown in FIGURE 20, all of the keys have a bow 131 and a shank 132 and appropriate serrations 133, but the trigger key has a high or shallow notch 134 higher than any other serrations between it and the end of the key. The primary or temporary key has an intermediate notch 136 and the secondary or permanent key has a low or deep notch 137. The notch depths are measured from the lower edge 138 of the key shank 132.

The keys are used with a rotor 141 turnable in a body 142. The rotor carries a telescoping pin tumbler 143 cooperatively arranged with a lower pin 144 and an upper pin 146 pressed away from a shoulder by a spring 147.

Figure 15:
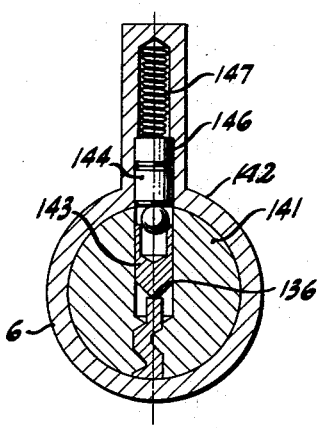
FIGURE 15 is a schematic view of a lock unit in condition for use of a temporary key.
Figure 16:
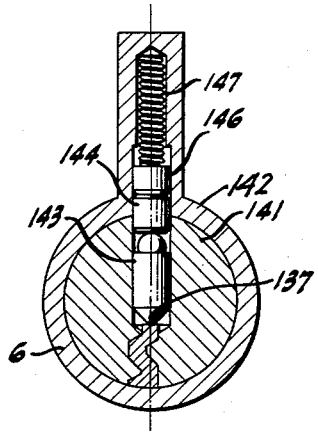
FIGURE 16 is a schematic view of the lock unit of FIGURE 15 in condition in which a permanent key is ineffective.

When the temporary or primary key is inserted, as shown in FIGURE 15, the notch 136 establishes the position of the extended telescopic pin tumbler 143 so that there are shear surfaces between the tumbler 143 and the lower pin 144 and the rotor 141 can be turned. If the secondary or permanent key is used, the notch 137, as shown in FIGURE 16, disposes the extended pin tumbler 143 and the lower pin 144 so that the rotor cannot be turned.

Figure 17:
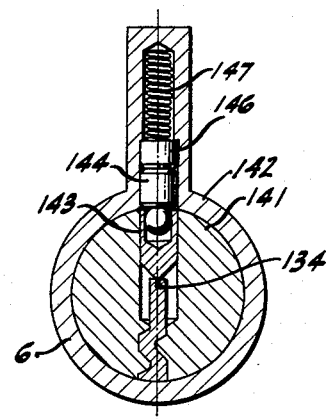
FIGURE 17 is a schematic view of a lock unit as conditioned by a trigger key.
Figure 18:
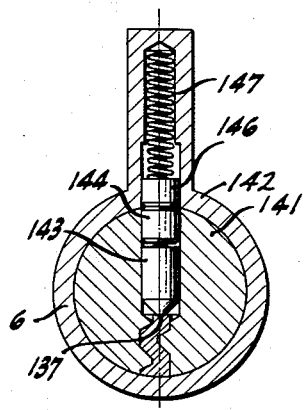
FIGURE 18 is a schematic view of the lock unit in condition for use of a permanent key.
Figure 19:
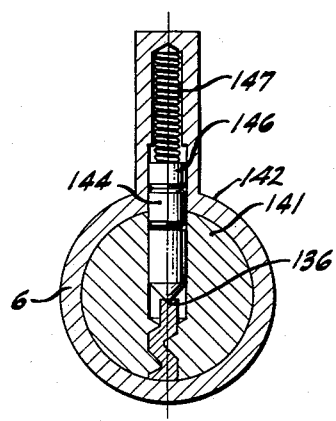
FIGURE 19 is a schematic view of the lock unit in condition in which the temporary key is ineffective.

When it is desired to make the permanent key operative, the trigger key is introduced and because of its high notch 134, as seen in FIGURE 17, is effective as it is positioned to telescope or shorten the pin tumbler 143. The trigger key itself is always effective to turn the rotor 141 after the tumbler 143 has been shortened. Thereafter, when the secondary key is utilized, as shown in FIGURE 18, the notch 137 so positions the short pin tumbler 143 as to put the shear surfaces between the lower pin 144 and the upper pin 146 in place for rotor turning.

Thereafter, when the primary key is tried, the upper surface of the notch 136 positions the shortened pin tumbler 143 and the lower pin 144 in such a fashion that the various shear surfaces are not in location for the rotor to be turned.

What is claimed is:

1. A pin tumbler cylinder and key system comprising a body with a cylinder bore therein and having a tumbler bore intersecting said cylinder bore, a spring in said tumbler bore, a tumbler in said tumbler bore against said spring, a rotor in said cylinder bore and rotatable therein relative to said body, said rotor having a pin bore therein in one position of said rotor adapted to align with said tumbler bore, means forming a channel in said rotor for receiving a key, said channel intersecting said pin bore, a variable length tumbler pin in said pin bore and having one end adapted to lie entirely within said pin bore when a temporary key is in said channel against the other end of said tumbler pin and adapted to extend into said tumbler bore when a permanent key is in said channel against said other end of said tumbler pin, and means for shortening said variable length tumbler pin by camming said one end against said body upon the initial rotation of said rotor with said permanent key in said channel.

2. A pin tumbler cylinder and key system comprising a body having a cylindrical bore therein, one portion of said bore being radially enlarged to provide an inclined cam surface, a rotor rotatable in said bore and having a radial pin bore therein, a variable length pin tumbler in said pin bore, means for holding one portion of said pin tumbler in position in said rotor while another portion of said pin tumbler is extended to be disposed against said cam surface, and means for rotating said rotor in said body and said other portion of said pin tumbler against said cam surface to force said pin tumbler from extended position to retracted position.

3. A pin tumbler cylinder and key system comprising a body having a cylindrical bore therein, one portion of said bore having an enlargement to provide a shoulder, a rotor disposed in said bore and rotatable relative to said body, means in said rotor for receiving a pin tumbler, a pin tumbler disposed in said receiving means and having an end movable from a long position extending into said enlargement to a short position within said bore, means for rotating said rotor in said body and thereby moving said end and said shoulder into contact, and means forming camming surfaces on said pin tumbler and on said shoulder effective to move said end from long position to short position during rotation of said rotor in said body with said camming surfaces in contact.

4. A pin tumbler cylinder and key system as in claim 3 in which said means for rotating said rotor is a key in engagement with said rotor and said pin tumbler.

5. A pin tumbler cylinder and key system comprising a body having a cylinder bore therein and having a tumbler bore intersecting said cylinder bore, a rotor mounted to rotate within said cylinder bore, said rotor having a key channel therein and having a pin bore intersecting said key channel and disposed in alignment with said tumbler bore in one rotated position of said rotor, a variable length pin tumbler disposed in said pin bore and movable between a long position and a short position, said pin tumbler when abutting a key in said channel and in said long position extending into said tumbler bore, and means on said body engageable by one end of said pin tumbler upon rotation of said rotor for moving said pin tumbler from long position to short position when said key is in said channel.

6. A pin tumbler cylinder and key system comprising a body having a cylinder bore therein and having a tumbler bore intersecting said cylinder bore, a rotor mounted to rotate within said cylinder bore, said rotor having a key channel therein and having a pin bore intersecting said key channel and disposed in alignment with said tumbler bore in one rotated position of said rotor, a variable length pin tumbler disposed in said pin bore and movable between a long position and a short position, said pin tumbler when abutting a key in said channel and in said long position extending into said tumbler bore, and means forming interengaging surfaces on said body and on said pin tumbler for camming said tumbler pin from long position to short position when said rotor is rotated by said key in said channel.

7. A pin tumbler cylinder and key system comprising a body, a key-receiving rotor in said body, means in said body and rotor forming a pin tumbler combination movable from locked condition to unlocked condition when a primary key with a low notch is in said rotor, means including a variable length pin tumbler in said combination for changing said combination to move from locked condition to unlocked condition only when a secondary key with a high notch is in said rotor, said changing means including means actuated by the rotation of said rotor with said secondary key completely inserted in said rotor for changing the length of said variable length pin tumbler.

8. A pin tumbler cylinder and key system comprising a body having a cylinder bore therein and having a tumbler bore intersecting said cylinder bore substantially normal to the axis of said cylinder bore and providing a shoulder at the intersection of said cylinder bore and tumbler bore, a rotor in said cylinder bore and rotatable therein relative to said body, said rotor having a key channel extending axially therein and having a pin bore intersecting said key channel substantially normal to the axis of said rotor, a variable length pin tumbler adapted to be disposed in said pin bore and having one end abutting against a key in said key channel, said pin tumbler having another end adapted in one position to extend into said tumbler bore, and an inclined surface on said other end of said pin tumbler adapted to engage said shoulder when said rotor is partially turned by said key and to move said other end of said pin tumbler out of said tumbler bore and into said pin bore when said rotor is additionally turned by said key.

9. In a pin tumbler cylinder lock, a body, a rotor rotatable in said body, means in said rotor for receiving a pin tumbler, a two part telescoping pin tumbler disposed in and having one of said parts projecting from said receiving means, and means actuated by a key engaging the other of said parts of said pin tumbler and rotating said rotor in said body for forcing said one part of said pin tumbler against said body and telescoping said two parts of said pin tumbler.

10. A pin tumbler cylinder and key system comprising a body having a cylinder bore therein, a rotor having a cylindrical surface in said cylinder bore and rotatable relative to said body, means forming a pin bore in said rotor, means forming a key channel in said rotor intersecting said pin bore, a variable length pin tumbler in said pin bore, one end of said pin tumbler being flush with said surface of said rotor when the other end of said pin tumbler abuts a temporary key in said key channel and said one end of said pin tumbler projecting from said rotor when the other end of said pin tumbler abuts a permanent key in said key channel, means forming a camming surface on said one end of said pin tumbler, and a shoulder on said body in the rotational path of said projecting cam surface and adapted to force said one end of said pin tumbler flush with said surface of said rotor when said rotor is rotated in said body with said shoulder in engagement with said projecting cam surface.

11. A device as in claim 10 in which said pin tumbler has relatively slidable parts actuated by movement of said camming surface over said shoulder.

References Cited by the Examiner
UNITED STATES PATENTS

| | | | |
|---|---|---|---|
| 2,194,469 | 3/40 | Fremon | 70—364 |
| 2,232,017 | 2/41 | Wilder | 70—364 |
| 2,232,137 | 2/41 | Rolph | 70—364 |
| 3,073,146 | 1/63 | Patriquin | 70—383 |

ALBERT H. KAMPE, *Primary Examiner.*